UNITED STATES PATENT OFFICE.

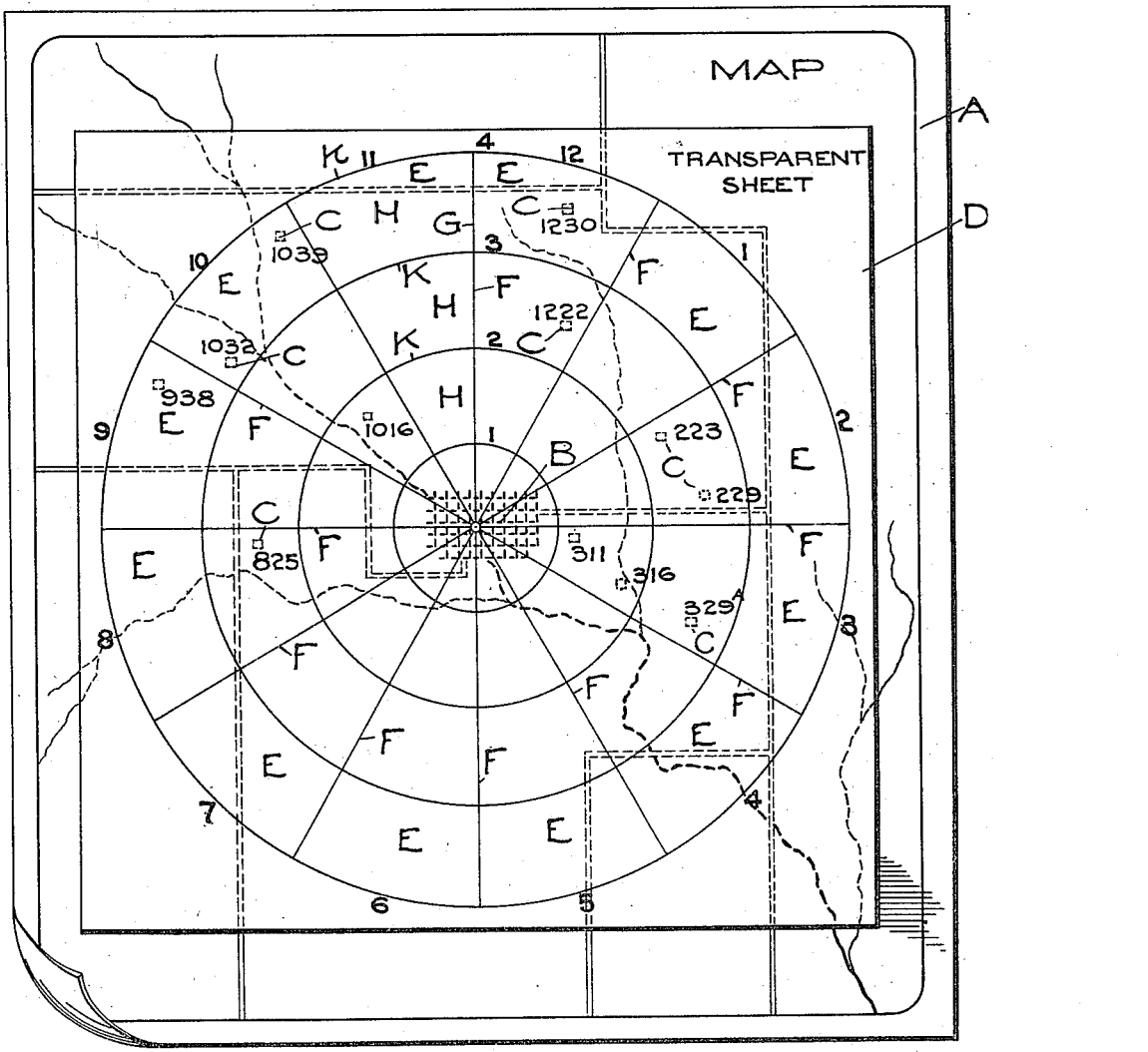

JOHN BYRON PLATO, OF SEMPER, COLORADO.

MAP OR CHART.

1,147,749.      Specification of Letters Patent.      Patented July 27, 1915.

Application filed December 7, 1914. Serial No. 875,956.

*To all whom it may concern:*

Be it known that I, JOHN B. PLATO, a citizen of the United States, residing at Semper, in the county of Jefferson and State of Colorado, have invented certain new and useful Improvements in Maps or Charts, of which the following is a specification.

This invention relates to a system of designating dwellings in rural districts, by numbers or other distinctive symbols, principally for the purpose of facilitating the delivery of mail by what is commonly known as the rural free delivery service.

In the practice of my system, use is made of charts or maps on which the delivery area surrounding or adjoining a determinate distributing point, is divided into districts and zones by lines arranged in regular order with relation to said point.

The dwellings in the divided territory are designated by symbols characterized by distinctive features which identify the districts in which the dwellings are located, and furthermore by distinctive features which designate the zones in which the dwellings may be found.

The method of designation is based on a simple rule which enables any person familiar with the system to determine from the symbols, the exact districts and zones in which the dwellings they designate are located as well as the topographical position of said districts and zones with relation to the distributing point.

In the accompanying drawing is shown a map A on which the letter B designates a city or town from which the mail is distributed throughout the surrounding territory, and the letters C, dwellings located in the said territory. The lines, numbers and other symbols which together constitute my system of division and identification, may be drawn or printed upon a sheet D of transparent material which when laid upon the map divides the area it covers, or they may be drawn or printed directly on the face of the map or chart.

The area surrounding the town B is divided into districts E by means of a series of lines F which radiate equidistantly from a determined center in the town. This center may be the post office, the point of intersection of two of the principal streets or of two section lines, or any other definitely established point. For the purpose of facilitating the remembrance of the order in which the different districts are arranged, the dividing lines are limited in numbers to 12 and one of them is placed in a northerly direction. The twelve lines are numbered in clockwise succession from 1 to 12, beginning with the first line east of the north line G, which system it will be observed corresponds with the divisions of a clock and is therefore easily remembered. The territory surrounding the town B is furthermore divided into zones H by concentric circles K, the center of which coincides with that from which the lines F radiate. The circles are drawn at equal distances in accordance with a standard system of measurement, thereby serving to designate the approximate distance of any geographical location in the divided territory, from the central point. It is preferred to space the circles a distance of one mile and to number them consecutively from the center outwardly so that the number of each circle denotes its distance from the center of distribution.

Having thus described the system of delineation by which a given area is divided into districts and zones, I will now explain the method of designating the dwellings in these divisions by symbols which denote their geographical location.

The dwellings are designated by numerical symbols each containing two numbers which correspond respectively with the numbers of the district and of the zone in which said dwellings are located. The left-hand number of the symbols thus designate the districts in which the dwellings are located, and the next adjoining number the zones in which they may be found. The districts being numbered in accordance to the hereinbefore described system of numbering the lines F, we find for example, that all the dwellings in the district to the right of the north line G are designated by numerical symbols, the left hand numbers of which are 12, those in the district in advance of line 9 have symbols the first number of which is 9 or commences with the digit 9 and so on. The other numbers of the symbols designate the zones in which the dwellings to which they are applied, are located, or in other words, the approximate distance of the dwellings from the central point of distribution. For example, a dwelling in the zone between the inner circle of the series and that next adjointing it are designated by symbols the right hand number of which commences with the figure 1, those located between the third and fourth circles by symbols, the second number of which commences with 3 and so on. It will thus be seen that by this simple method, the geographical location of a dwelling can be instantly determined, as for example, dwelling No. 825 is located in the district between the 8th and 9th lines which is directly south of the westerly extending division line, and at an average distance of between two and three miles from the post-office, and dwelling No. 311 is in the district between the 3rd and 4th lines directly south of the easterly extending line, at a distance of between one and two miles from the distribution point.

The symbols which designate the dwellings in one of the areas into which the districts are subdivided by the zone circles, vary with respect to the last numeral of their right hand numbers, whereby each dwelling may be distinguished from the others, and in case one of these areas contains more than ten dwellings, the numbers can be further distinguished by the addition of a figure, letter, exponent or other symbol at their right hand side as illustrated in the drawing in the district between lines 3 and 4.

It will be observed that the subdivisions of the districts increase in area progressionally from the central point outwardly, which is of additional advantage in my system of designation, inasmuch as the territory closest to the town or city is naturally more densely settled than that at a greater distance.

It will be readily understood that by the use of my system as hereinbefore described, the work of delivering mail under the rural service is greatly facilitated, inasmuch as all the dwellings included in the territory permanently retain their numbers irrespective of the number or direction of the route on which they are located, and the latter can be changed as often as desired without the necessity of changing the numbers of the dwellings.

Any one familiar with the system of division and subdivision can immediately upon ascertaining the number of a dwelling, determine its approximate geographic location with relation to the predetermined point of distribution without consulting the map or chart, and the mail distributers and carriers by this means will know at once by which route the dwellings can be reached.

It will be readily understood that while I have described my system as being particularly adapted to designate dwellings in rural districts, it may be used equally well for the designation of mines or other geographic locations on a map or chart.

Having thus described my invention what I claim and desire to secure by Letters-Patent is:

1. A map or chart divided into consecutively numbered districts by lines radiating from a determinate point of distribution, and into consecutively numbered zones by concentric circles of which said point is the center, the dwellings in the divided area being designated by symbols containing two numbers which correspond respectively, with the numbers of the districts and the zones in which the dwellings the respective symbols designate, are located.

2. A map or chart divided into districts by lines radiating from a determinate point of distribution and into zones by circles of which said point is the center, the several districts and zones being differentiated by different characters, and geographical locations in the divided area being designated by symbols containing two characters which correspond respectively with the characters of the districts and the zones in which the locations the respective symbols designate, are established.

3. A map or chart divided into consecutively numbered districts by lines radiating from a determinate point of distribution and into consecutively numbered zones by concentric circles of which said point is the center, geographical locations in the divided area being designated by symbols containing two numbers which correspond respectively with the numbers of the districts and the zones in which the locations the respective symbols designate, are established, and a third number which differentiates the locations from others in the same district.

4. A map or chart divided into districts by twelve lines which radiate equidistantly from a determinate point of distribution and which are numbered in clockwise succession from 1 to 12, and into numbered zones by circles of which said point is the center, geographical locations in the divided area being designated by symbols containing two numbers which correspond respectively with the numbers of the zones and the districts in which the locations the respective symbols designate, are established.

5. A map or chart divided into districts by twelve lines which radiate equidistantly from a determinate point of distribution and which are numbered in clockwise succession from 1 to 12, geographical locations in the divided area being designated by symbols each containing a number which corresponds with that of the district in which the respective location is established.

6. A map or chart divided into districts by twelve lines which radiate equidistantly from a determinate point of distribution and which are numbered in clockwise succession from 1 to 12, and by circles of which said point is the center, into zones which are numbered in accordance with their distances expressed in miles or other units of measurement from the said center, geographical locations in the divided area being designated by symbols containing two numbers which correspond respectively with the numbers of the districts and the zones in which the locations the respective symbols designate, are established.

7. A map or chart divided by lines radiating from a determinate point of distribution into consecutively numbered districts and by circles of which said point is the center, into zones which are numbered in accordance with their distances expressed in miles or other units of measurement from the said center, geographical locations in the divided area being designated by symbols containing two numbers which correspond respectively with the numbers of the districts and the zones in which the locations the respective symbols designate, are established.

8. A map or chart divided into zones by concentric circles which commencing at their center are numbered in accordance with their distances expressed in miles or other units of measurement from the said center, geographical locations in the divided area being designated by symbols each containing a number which corresponds with that of the zone in which the location the respective symbol designates, is established.

JOHN BYRON PLATO.

Witnesses:
FRED BEES,
JNO. Q. ADAMS.